United States Patent [19]
Kagawa et al.

[11] Patent Number: 5,302,506
[45] Date of Patent: Apr. 12, 1994

[54] SILVER HALIDE PHOTOGRAPHIC MATERIALS

[75] Inventors: Nobuaki Kagawa; Shinri Tanaka, both of Hino, Japan

[73] Assignee: Konica Corporation, Tokyo, Japan

[21] Appl. No.: 901,130

[22] Filed: Jun. 19, 1992

[30] Foreign Application Priority Data

Jun. 26, 1991 [JP] Japan ................................ 3-181980

[51] Int. Cl.$^5$ ................................................ G03C 1/18
[52] U.S. Cl. ..................................... 430/572; 430/576; 430/581; 430/583; 430/587
[58] Field of Search ............... 430/585, 583, 572, 576, 430/581, 587

[56] References Cited

U.S. PATENT DOCUMENTS

| | | |
|---|---|---|
| 1,846,302 | 2/1932 | Brooker . |
| 2,072,908 | 3/1937 | Schneider . |
| 2,112,140 | 3/1938 | Brooker et al. . |
| 2,336,843 | 12/1943 | Brooker et al. . |
| 2,369,646 | 2/1945 | Brooker et al. . |
| 2,385,815 | 10/1945 | Kendall et al. . |
| 2,415,927 | 2/1947 | Anish . |
| 2,429,574 | 10/1947 | Anish et al. . |
| 2,478,366 | 8/1949 | Brooker et al. . |
| 2,481,464 | 9/1949 | Anish . |
| 2,484,536 | 10/1949 | Van de Straete . |
| 2,485,679 | 10/1949 | Van Zandt et al. . |
| 2,515,913 | 7/1950 | Van Zandt et al. . |
| 2,521,705 | 9/1950 | Firestine . |
| 2,647,050 | 7/1953 | Firestine . |
| 2,647,051 | 7/1953 | Vinton et al. . |
| 2,647,052 | 7/1953 | Martin . |
| 2,647,053 | 7/1953 | Vinton . |
| 2,739,964 | 3/1956 | Brooker et al. . |
| 2,938,892 | 5/1960 | Sheehan . |
| 2,950,197 | 8/1960 | Allen et al. . |
| 2,964,404 | 12/1960 | Burness . |
| 2,983,611 | 5/1961 | Allen et al. . |

(List continued on next page.)

FOREIGN PATENT DOCUMENTS 1577734 8/1969 France ............................ 430/585

Primary Examiner—Thorl Chea
Attorney, Agent, or Firm—Finnegan, Henderson, Farabow, Garrett & Dunner

[57] ABSTRACT

The improved silver halide photographic material is such that the silver halide grains contained in at least one light-sensitive silver halide emulsion layer are spectrally sensitized with a sensitizing dye represented by the following general formula:

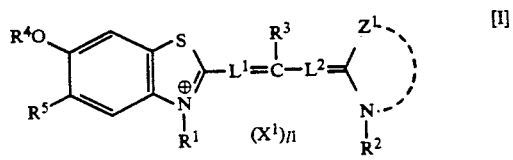

where $R^1$ and $R^2$ each represents an alkyl group having 1-10 carbon atoms or an alkenyl group having 3-10 carbon atoms; $R^3$ represents a hydrogen atom, a heterocyclic group, an aryl group or an alkyl group; $R^4$ and $R^5$ each represents an alkyl group; $Z^1$ represents the group of non-metallic atoms necessary to form a 5-membered monocyclic or condensed nitrogenous hetero ring; $L^1$ and $L^2$ each represents a methine group, provided that $R^1$ or $R^2$ may combine with $L^1$ or $L^2$, respectively, to form a 5- or 6- membered hereto ring; $X^1$ represents an ion that cancels an electric charge in the molecule; $^1$ represents the number of ions necessary to cancel electric charges in the molecule. The silver halide photographic material has an enhanced spectral sensitivity in the red wavelength range while causing less color contamination.

5 Claims, No Drawings

U.S. PATENT DOCUMENTS

| | | |
|---|---|---|
| 3,047,394 | 7/1962 | Allen et al. . |
| 3,226,234 | 12/1965 | Himmelmann et al. . |
| 3,271,175 | 9/1966 | Burness et al. . |
| 3,282,932 | 11/1966 | Lincoln et al. . |
| 3,325,287 | 6/1967 | Yamamoto et al. . |
| 3,331,609 | 7/1967 | Moran . |
| 3,384,489 | 5/1968 | Lincoln et al. . |
| 3,396,029 | 8/1968 | Himmelmann et al. . |
| 3,469,987 | 9/1969 | Owens et al. . |
| 3,490,911 | 1/1970 | Burness et al. . |
| 3,514,450 | 5/1970 | Rauch et al. ............ 260/240.6 |
| 3,539,644 | 11/1970 | Burness et al. . |
| 3,615,644 | 10/1971 | Gotze et al. . |
| 3,623,878 | 11/1971 | Nishio et al. . |
| 3,640,720 | 2/1972 | Cohen . |
| 3,676,147 | 7/1972 | Boyer et al. . |
| 3,822,135 | 7/1974 | Sakai et al. . |
| 3,832,181 | 8/1974 | Dallon et al. . |
| 3,840,370 | 10/1974 | Dallon et al. . |
| 4,043,818 | 8/1977 | Himmelmann et al. . |
| 4,047,957 | 9/1977 | De Winter et al. . |
| 4,061,499 | 12/1977 | Himmelmann . |
| 4,247,627 | 1/1981 | Chen . |
| 4,326,023 | 4/1982 | DeSeyn .................... 430/550 |
| 4,740,455 | 4/1988 | Kubodera et al. ........... 430/617 |
| 4,818,676 | 4/1989 | Baba et al. ................ 430/574 |

SILVER HALIDE PHOTOGRAPHIC MATERIALS

BACKGROUND OF THE INVENTION

This invention relates to a silver halide photographic material (hereafter sometimes referred to simply as a "photographic material") and, more particularly, to a photographic material that is not only enhanced in the spectral sensitivity to the red wavelength range by novel sensitizing dyes but also improved in photographic characteristics.

It is well known that certain kinds of polymethine dyes are very effective as a means of spectrally sensitizing silver halide emulsions and many types of dye compounds are described in references such as T. H. James, "The Theory of the Photographic Process", Fourth Edition, pp.194–234, 1977, Macmillan Publishing Co., Inc., New York. Requirements for these sensitizing dyes are not limited to extending the wavelength range of sensitivity of silver halide emulsions and other conditions to be met are as follows:

1) they should achieve appropriate levels of spectral dye sensitization;
2) they should have a sufficient efficiency of sensitization to provide a satisfactorily high sensitivity;
3) they should not cause fogging;
4) they should not cause adverse interactions with other additives such as a stabilizer, an antifoggant, a coupler, a DP' scavenger and a coating aid;
5) they should not experience dye desorption or desensitization even if silver halide emulsions containing them are left to stay long after application;
6) they should not increase the fog density or cause desensitization even if a silver halide photographic material containing them is left to stand for a prolonged time in a hot and humid atmosphere; and
7) they should not cause color contamination (or color mixing) after development as a result of diffusion from the light-sensitive layer containing them to another sensitive layer.

Various compounds have been proposed and synthesized with a view to meeting these conditions that bear great importance in the preparation of silver halide emulsions. Among those compounds, azole-ring trimethine cyanine dyes having chalcogen atoms in the ring as typified by thiacarbocyanine, oxathiacarbocyanine, selenacarbocyanine and oxaselenacarbocyanine are characterized by having preferred spectra in the red region while insuring high efficiency of spectral sensitization and they are known as principal red sensitizers. Specific examples of those dyes include: the cyanine dyes that have an alkoxy group as a substituent on the condensed ring and which are described in U.S. Pat. No. 3,615,644; the methylenedioxy-substituted thiacarbocyanine dyes that are described in U.S. Pat. No. 2,429,574; the thiacarbocyanine dyes that have a phenyl group substituted in the 5-position and which are described in U.S. Pat. No. 2,515,913; the thiacarbocyanine dyes that have a carboxyl group substituted in the 5-position and which are described in U.S. Pat. No. 2,647,050; thiacarbocyanine dyes having an alkoxycarbonyl group substituted in the 5-position as described in U.S. Pat. Nos. 2,647,051 and 2,647,052; the carbocyanine dyes that have a phenyl group substituted in the 6-position and which are described in U.S. Pat. No. 2,485,679; the saturated carboncyclic condensed thiazolocarbocyanine dyes that are described in U.S. Pat. No. 2,336,843; various other carbocyanine dyes as described in U.S. Pat. Nos. 1,846,302, 2,112,140 and 2,481,464; trimethine dyes having a substituent on methine carbon atoms as described in U.S. Pat. Nos. 2,369,646, 2,385,815, 2,484,536, 2,415,927, 2,478,366, 2,739,964, 3,282,932 and 3,384,489; anion substituted trimethinecyanine dyes as described in U.S. Pat. Nos. 2,647,053, 2,521,705, 2,072,908, British Patent 654,690 and Examined Japanese Patent Publication No. 21711/1961; and the oxathiacarbocyanine dyes that are described in British Patent 1,012,825. Some of these cyanine dyes, as used either independently or in combination with themselves, are capable of satisfying the aforementioned conditions 1)–7); however, further improvements are needed in order to satisfy the conditions required of recent versions of photographic materials, namely, higher sensitivity, a lower level of color remnant and better storage stability.

SUMMARY OF THE INVENTION

The present invention has been accomplished under these circumstances and has as a first object providing a silver halide photographic material that is enhanced in the spectral sensitivity to the red wavelength range.

A second object of the present invention is to provide a silver halide photographic material that is reasonably protected against color contamination.

These objects of the present invention can be attained by a silver halide photographic material that comprises a base and overlying photographic constituent layers including at least one light-sensitive silver halide emulsion layer, characterized in that the silver halide grains contained in at least one of said light-sensitive silver halide emulsion layers are spectrally sensitized with at least one sensitizing dye represented by the following general formula [I]:

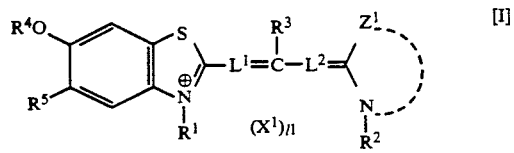

where $R^1$ and $R^2$ each independently represents an alkyl group having 1–10 carbon atoms or an alkenyl group having 3–10 carbon atoms; $R^3$ represents a hydrogen atom, a heterocyclic group, and aryl group or an alkyl group; $R^4$ and $R^5$ each represents an alkyl group; $Z^1$ represents the group of non-metallic atoms necessary to form a 5-membered monocyclic or condensed nitrogenous hetero ring; $L^1$ and $L^2$ each represents a methine group, provided that $R^1$ or $R^2$ may combine with $L^1$ or $L^2$, respectively, to form a 5- or 6-membered hetero ring; $X^1$ represents an ion that cancels an electric charge in the molecule; $l^1$ represents the number of ions necessary to cancel electric charges in the molecule, provided that when the compound of interest forms an intramolecular salt, $l^1$ is zero.

DETAILED DESCRIPTION OF THE INVENTION

In the general formula [I], $R^1$ and $R^2$ each independently represents an alkyl group having 1–10 carbon atoms or an alkenyl group having 3–10 carbon atoms. The alkyl and alkenyl groups may be straight-chained or branched; exemplary alkyl groups include methyl, ethyl, propyl, butyl, pentyl, iso-pentyl, 2-ethyl-hexyl, octyl and decyl; and exemplary alkenyl groups include 2-propenyl, 3-butenyl, 1-methyl-3-propenyl, 3-pentenyl, 1-methyl-3-butenyl and 4-hexenyl. These groups may have substituents as exemplified by a halogen atom (e.g. fluorine, chlorine or bromine), an alkoxy group (e.g. methoxy or ethoxy), an aryloxy group (e.g. phenoxy or p-tolyloxy), a cyano group, a carbamoyl group (e.g. carbamoyl, N-methylcarbamoyl, or N,N-tetramethylenecarbamoyl), a sulfamoyl group (e.g. sulfamoyl or N,N-3-oxapentamethyleneaminosulfonyl group), a methanesulfonyl group, an alkoxycarbonyl group (e.g. ethoxycarbonyl or butoxycarbonyl), an aryl group (e.g. phenyl or carboxyphenyl), an acyl group (e.g. acetyl or benzoyl), an acylamino group (e.g. acetylamino or benzoylamino), and sulfonamido group (e.g. methanesulfonamido or butanesulfonamido). Preferably, the alkyl and alkenyl groups have a water-soluble group such as a sulfo, carboxyl, phosphono, sulfate, hydroxyl or sulfino group.

Examples of the alkyl group having a water-soluble group as a substituent include carboxymethyl, sulfoethyl, sulfopropyl, sulfobutyl, sulfopentyl, 3-sulfobutyl, hydroxyethyl, carboxyethyl, 3-sulfinobutyl, 3-phosphonopropyl, p-sulfobenzyl and o-carboxybenzyl. Examples of the alkenyl group having a water-soluble group as a substituent include 4-sulfo-3-butenyl and 2-carboxy-2-propenyl.

The alkyl group represented by $R^3$, $R^4$ and $R^5$ may be exemplified by a chained group having 1–6 carbon atoms (e.g. methyl, ethyl, propyl, butyl, pentyl or hexyl). Examples of the heterocyclic group represented by $R^3$ include 2-furyl, 2-thienyl, 1,3-bis(2-methoxyethyl)-6-hydroxy-2,4-dioxo-1,2,3,4-tetrahydropyrimidin-5-yl. Exemplary aryl groups include phenyl and naphthyl.

The alkyl group, heterocyclic group and aryl group described above may have a substituent in a desired position. Exemplary substituents include a halogen atom (e.g. fluorine, chlorine, bromine or iodine), a trifluoromethyl group, an alkoxy group (e.g. an unsubstituted alkoxy group such as methoxy, ethoxy or butoxy, or a substituted alkoxy group such as 2-methoxyethoxy or benzyloxy), a hydroxyl group, a cyano group, an aryloxy group (e.g. a substituted or unsubstituted aryloxy group such as phenoxy or tolyloxy), an aryl group (e.g. a substituted or unsubstituted aryl group such as phenyl, p-chlorophenyl, p-carboxyphenyl or o-sulfophenyl), a styryl group, a heterocyclic group (e.g. thiazolyl, pyridyl, furyl or thienyl), a carbamoyl group (e.g. carbamoyl or N-ethylcarbamoyl), a sulfamoyl group (e.g. sulfamoyl or N,N-dimethylsulfamoyl), an acylamino group (e.g. acetylamino, propionylamino or benzoylamino), an acyl group (e.g. acetyl or benzoyl), an alkoxycarbonyl group (e.g. ethoxycarbonyl), a sulfonamido group (e.g. methanesulfonamido or benzenesulfonamido), a sulfonyl group (e.g. methanesulfonyl, butanesulfonyl or p-toluenesulfonyl), a sulfo group, a carboxyl group, and an alkyl group (e.g. a substituted or unsubstituted alkyl group such as methyl, ethyl, iso-propyl, methoxyethyl, cyanomethyl or cyclohexyl group).

Examples of the 5-membered monocyclic or condensed nitrogenous hetero ring formed by $Z^1$ include an oxazole ring (e.g. oxazoline, oxazolidine, benzoxazoline, tetrahydrobenzoxazoline or naphthoxazoline), a thiazole ring (e.g. thiazoline, thiazolidine, 1,3,4-thiadiazoline, benzothiazoline, tetrahydrobenzothiazoline or naphthothiazoline), a selenazole ring (e.g. selenazoline, selenazolidine, tetrahydrobenzoselenazoline, benzoselenazoline or naphthoselenazoline), and an imidazole ring (e.g. imidazoline, imidazolidine, benzimidazoline or naphthoimidazoline). These rings may have a substituent in a desired position and exemplary substituents include: a halogen atom (e.g. fluorine, chlorine, bromine or iodine), an alkoxyl group (e.g. an unsubstituted alkoxyl group such as methoxy, ethoxy or butoxy, or a substituted alkoxyl group such as 2-methoxyethoxy or benzyloxy), a hydroxyl group, a cyano group, an aryloxy group (e.g. a substituted or unsubstituted aryloxy group such as phenoxy or tolyloxy), an aryl group (e.g. a substituted or unsubstituted aryl group such as phenyl or p-chlorophenyl), a styryl group, a heterocyclic group (e.g. thiazolyl, pyridyl, furyl or thienyl), a carbamoyl group (e.g. carbamoyl or N-ethylcarbamoyl), a sulfamoyl group (e.g. sulfamoyl or N,N-dimethylsulfamoyl), an acylamino group (e.g. acetylamino, propionylamino or benzoylamino), an acyl group (e.g. acetyl or benzoyl), an alkoxycarbonyl group (e.g. ethoxycarbonyl), a sulfonamido group (e.g. methanesulfonamido or benzenesulfonamido), a sulfonyl group (e.g. methanesulfonyl, butanesulfonyl or p-toluenesulfonyl), a carboxyl group, an alkyl group (e.g. a substituted or unsubstituted chained or cyclic alkyl group such as methyl, ethyl, iso-propyl, methoxyethyl, cyanomethyl or cyclohexyl).

The methine group represented by $L^1$ and $L^2$ may be substituted or unsubstituted. Exemplary substituents include an alkyl group (e.g. a substituted or unsubstituted alkyl group such as methyl, ethyl, iso-butyl or methoxyethyl), an aryl group (e.g. a substituted or unsubstituted aryl group such as phenyl or p-chlorophenyl), an alkoxyl group (e.g. methoxy or ethoxy), an aryloxy group (e.g. phenoxy or naphthoxy).

The ion represented by $X^1$ which cancels an electric charge in the molecule is selected from among anions and cations. Anions include inorganics and organics and are specifically exemplified by a halide ion (e.g. chloride ion, bromide ion or iodide ion), an organic acid anion (e.g. p-toluenesulfonate, p-chlorobenzenesulfonate or methanesulfonate ion), a tetrafluoroborate ion, a perchlorate ion, a methylsulfuric acid ion and an ethylsulfuric acid ion. Cations also include inorganics and organics and are specifically exemplified by a hydrogen ion, an alkali metal ion (e.g. lithium, sodium, potassium or cesium ion), an alkaline earth metal ion (e.g. magnesium or calcium ion), an ammonium ion, and an organic ammonium ion (e.g. trimethylammonium, triethylammonium, tripropylammonium, triethanolammonium or pyridinium ion).

In the general formula [I], at least either one of $R^1$ and $R^2$ preferably has a water-soluble group (e.g. carboxyl, phosphono, hydroxyl or sulfo) as a substituent.

Specific examples of the sensitizing dye represented by the general formula [I] are listed below but it should be noted that the sensitizing dyes that can be used in the present invention are in no way limited to these compounds alone.

| No. | (X)$_l$ | R$^1$ | R$^2$ | R$^3$ | R$^4$ | R$^5$ | R$^6$ | R$^7$ | R$^8$ | R$^9$ |
|---|---|---|---|---|---|---|---|---|---|---|
| 1 | — | —CH$_2$COOH | —(CH$_2$)$_3$SO$_3^\ominus$ | —C$_2$H$_5$ | —CH$_3$ | —CH$_3$ | —H | —H | phenyl | —H |
| 2 | HN$^\oplus$(C$_2$H$_5$)$_3$ | —(CH$_2$)$_2$SO$_3^\ominus$ | —(CH$_2$)$_4$SO$_3^\ominus$ | —C$_2$H$_5$ | —CH$_3$ | —CH$_3$ | —H | —H | —Cl | —H |
| 3 | Li$^\oplus$ | —(CH$_2$)$_4$SO$_3^\ominus$ | —(CH$_2$)$_2$SO$_3^\ominus$ | —C$_2$H$_5$ | —CH$_3$ | —CH$_3$ | —H | —H | phenyl | —H |
| 4 | Li$^\oplus$ | —(CH$_2$)$_2$SO$_3^\ominus$ | —(CH$_2$)$_2$SO$_3^\ominus$ | —C$_2$H$_5$ | —CH$_3$ | —CH$_3$ | —H | —H | —OCH$_3$ | —H |
| 5 | HN$^\oplus$(C$_2$H$_5$)$_3$ | —CH$_2$-C$_6$H$_4$-SO$_3^\ominus$ | —(CH$_2$)$_4$SO$_3^\ominus$ | —C$_2$H$_5$ | —CH$_3$ | —CH$_3$ | —H | —CH$_3$ | —Cl | —H |
| 6 | Li$^\oplus$ | —(CH$_2$)$_4$SO$_3^\ominus$ | —(CH$_2$)$_3$SO$_3^\ominus$ | —CH$_3$ | —CH$_3$ | —CH$_3$ | —H | —H | —Cl | —H |
| 7 | — | —(CH$_2$)$_4$SO$_3^\ominus$ | —(CH$_2$)$_2$OH | —CH$_3$ | —CH$_3$ | —C$_2$H$_5$ | —H | —CH$_3$ | —H | —H |
| 8 | — | —(CH$_2$)$_2$SO$_3^\ominus$ | —(CH$_2$)$_4$SO$_3H | —CH$_3$ | —CH$_3$ | —CH$_3$ | —H | —H | —Cl | —H |
| 9 | — | —CH$_2$COOH | —(CH$_2$)$_4$SO$_3^\ominus$ | —C$_3$H$_7$(n) | —CH$_3$ | —CH$_3$ | —H | —H | —CH$_3$ | —H |
| 10 | HN$^\oplus$(C$_2$H$_5$)$_3$ | —(CH$_2$)$_4$SO$_3^\ominus$ | —CH$_2$-C$_6$H$_5$ | —CH$_3$ | —CH$_3$ | —CH$_3$ | —H | —H | —Cl | —H |
| 11 | Li$^\oplus$ | —(CH$_2$)$_3$SO$_3^\ominus$ | —(CH$_2$)$_4$SO$_3^\ominus$ | —H | —C$_3$H$_7$(n) | —CH$_3$ | —H | —H | —Cl | —H |
| 12 | Na$^\oplus$ | —(CH$_2$)$_4$SO$_3^\ominus$ | —(CH$_2$)$_2$SO$_3^\ominus$ | —C$_2$H$_5$ | —CH$_3$ | —CH$_3$ | —H | —H | benzo-fused | —H |

-continued

| No. | | | | | | | | | |
|---|---|---|---|---|---|---|---|---|---|
| 13 | — | —(CH₂)₃SO₃⁻ | | —C₂H₅ | —C₂H₅ | —H | —H | —Cl | —H |
| 14 | Na⊕ | —(CH₂)₄SO₃⁻ | —(CH₂)₂SO₃⁻ | —C₂H₅ | —C₂H₅ | —H | —H | —Cl | —H |
| 15 | — | —CH₂COOH | —(CH₂)₂COOH | —C₂H₅ | —CH₃ | —CH₃ | | | —H | —C₅H₁₁(t) |
| 16 | HN⊕(C₂H₅)₃ | —(CH₂)₂SO₃⁻ | —(CH₂)₃SO₃⁻ | —C₂H₅ | —CH₃ | —CH₃ | —H | —H | —H | |

$$\underset{R^4O\underset{R^5}{\diagdown}\underset{}{\diagup}\overset{S}{\underset{\oplus N-R^1}{\diagup}}C=CH-\overset{R^3}{\underset{}{C}}=\overset{R^6}{\underset{}{\diagdown}}\overset{R^7}{\underset{}{\diagup}}\overset{R^8}{\underset{R^9}{\diagdown}}\overset{S}{\underset{N-R^2}{\diagup}}}{(X)_l}$$

| No. | R¹ | R² | R³ | R⁴ | R⁵ | R⁶ | R⁷ | R⁸ | R⁹ | (X)ₗ |
|---|---|---|---|---|---|---|---|---|---|---|
| 17 | —(CH₂)₄SO₃⁻ | —(CH₂)₄SO₃⁻ | —C₂H₅ | —CH₃ | —CH₃ | —H | —H | —Cl | —H | Li⊕ |
| 18 | —(CH₂)₃SO₃⁻ | —(CH₂)₃SO₃⁻ | —C₂H₅ | —CH₃ | —CH₃ | —H | —H | —OCH₃ | —H | HN⊕(C₂H₅)₃ |
| 19 | —(CH₂)₃SO₃⁻ | —CH₂COOH | —C₂H₅ | —CH₃ | —CH₃ | —H | —H | —CH₃ | —H | — |
| 20 | —CH₂—C₆H₄—SO₃⁻ | —CH₂—C₆H₄—SO₃⁻ | —C₂H₅ | —C₂H₅ | —CH₃ | —H | —H | (—C₆H₄— fused) | —H | HN⊕(C₂H₅)₃ |
| 21 | —(CH₂)₃SO₃⁻ | —(CH₂)₃SO₃⁻ | —C₃H₇ | —CH₃ | —CH₃ | —H | —H | —Cl | —H | HN⊕(C₂H₅)₃ |
| 22 | —(CH₂)₃SO₃⁻ | —(CH₂)₃SO₃⁻ | —C₂H₅ | —CH₃ | —CH₃ | —H | —OCH₃ | —CH₃ | —H | Li⊕ |
| 23 | —(CH₂)₃SO₃⁻ | —(CH₂)₃SO₃⁻ | —CH₃ | —CH₃ | —CH₃ | —H | —OCH₃ | —CH₃ | —H | Na⊕ |
| 24 | —(CH₂)₄SO₃⁻ | —(CH₂)₄SO₃⁻ | —C₆H₅ | —CH₃ | —CH₃ | —H | —OCH₃ | —CH₃ | —H | HN⊕(C₂H₅)₂ |
| 25 | —CH₂COOH | —(CH₂)₄SO₃⁻ | —C₂H₅ | —CH₃ | —CH₃ | —H | —OCH₃ | —CH₃ | —H | — |
| 26 | —(CH₂)₂SO₃⁻ | —(CH₂)₂SO₃⁻ | —C₂H₅ | —CH₃ | —CH₃ | —H | —OCH₃ | —CH₃ | —H | HN⊕(C₂H₅)₃ |
| 27 | —(CH₂)₃SO₃⁻ | —(CH₂)₂SO₃⁻ | —C₂H₅ | —C₂H₅ | —CH₃ | —H | —OC₂H₅ | —CH₃ | —H | K⊕ |
| 28 | —CH₂COOH | —(CH₂)₂SO₃⁻ | —C₂H₅ | —CH₃ | —CH₃ | —H | —H | —Cl | —H | — |

-continued

| No. | R¹ | R² | R³ | Z | R⁴ | R⁵ | R⁶ | R⁷ | (X)l |
|-----|------|------|------|------|------|------|------|------|------|
| 29 | —(CH₂)₃SO₃⁻ | —(CH₂)₃SO₃⁻ | —C₂H₅ |  | —CH₃ | —H | —H | —CH₃ | K⊕ |
| 30 | —CH₂COOH | —CH₂COO⁻ | —CH₂C₆H₅ |  | —C₃H₇ | —H | —OC₃H₇ | —CH₃ | — |
| 31 | —(CH₂)₄SO₃⁻ | —(CH₂)₄SO₃⁻ | —CH₃ |  | —CH₃ | —H | —CH₃ | —CH₃ | HN⊕(C₂H₅)₃ |
| 32 | —CH₂COOH | —(CH₂)₂SO₃⁻ | —CH₃ |  | —CH₃ | —H | —CH₃ | —H | Li⊕ |
| 33 | —(CH₂)₃SO₃⁻ | —(CH₂)₃SO₃⁻ | —H |  | —CH₃ | —H | —OCH₃ | —CH₃ | HN⊕(C₂H₅)₃ |
| 34 | —(CH₂)₃SO₃⁻ | —(CH₂)₃SO₃⁻ | —(2-thienyl) |  | —CH₃ | —H | —OCH₃ | —CH₃ | Na⊕ |
| 35 | —C₂H₅ | —C₂H₅ | (barbiturate structure with C₂H₄OCH₃ and CH₃OH₄C₂) |  | —CH₃ | —H | —OCH₃ | —CH₃ | — |

| No. | R¹ | R² | R³ | R⁴ | R⁵ | Y | R⁶ | R⁷ | R⁸ | R⁹ | (X)l |
|-----|------|------|------|------|------|------|------|------|------|------|------|
| 36 | —(CH₂)₃SO₃⁻ | —(CH₂)₃SO₃⁻ | —C₂H₅ | —CH₃ | —CH₃ | Se | —H | —H | —CH₃ | —H | HN⊕(C₂H₅)₃ |
| 37 | —CH₂COOH | —CH₃ | —CH₃ | —CH₃ | —CH₃ | Se | —H | —H | —Cl | —H | Li⊕ |
| 38 | —(CH₂)₄SO₃⁻ | —(CH₂)₄SO₃⁻ | —C₂H₅ | —CH₃ | —CH₃ | Se | —H | —H | —H | —H | — |
| 39 | —CH₂COOH | —(CH₂)₃SO₃⁻ | —H | —C₂H₅ | —CH₃ | Se | —H | —Cl | —CH₃ | —H | Li⊕ |
| 40 | —(CH₂)₃SO₃⁻ | —(CH₂)₃SO₃⁻ | —C₂H₅ | —CH₃ | —CH₃ | Se | —H | —H | —CH₃ | —H | Li⊕ |
| 41 | —(CH₂)₃SO₃⁻ | —(CH₂)₃SO₃⁻ | —H | —CH₃ | —CH₃ | >NC₂H₅ | —H | —Cl | —Cl | —H | K⊕ |

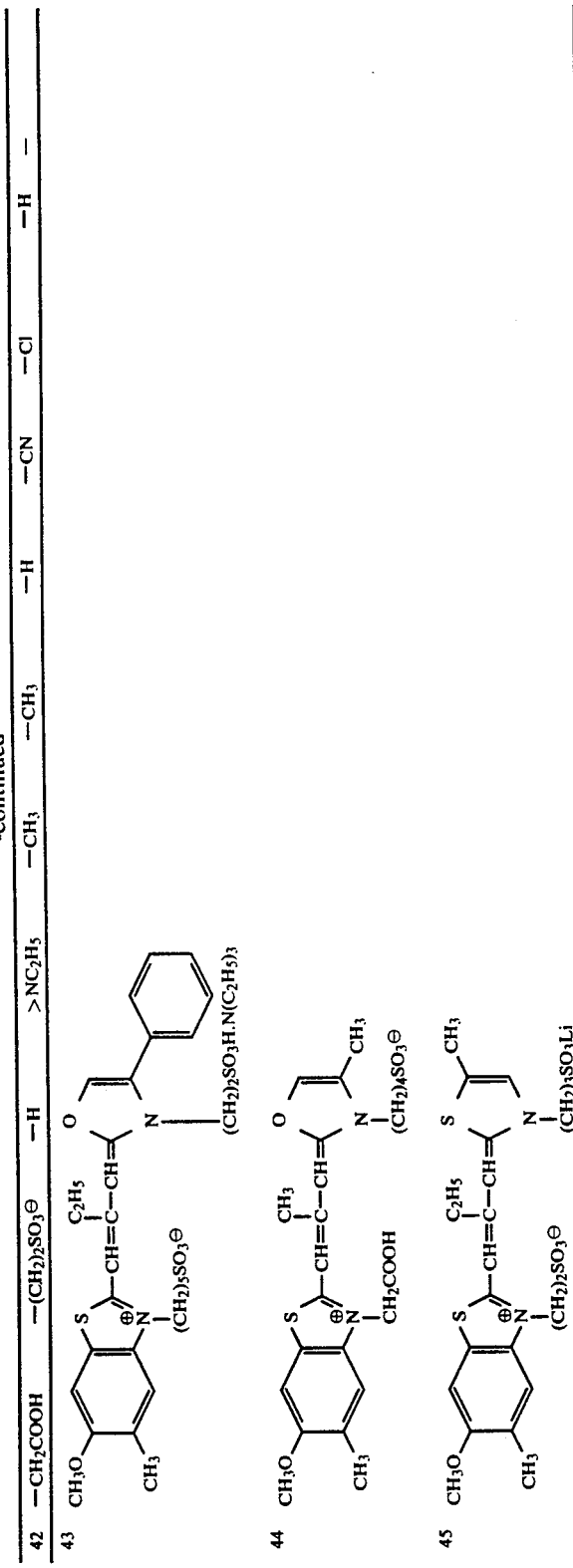

In a preferred embodiment of the present invention, the sensitizing dye represented by the general formula [I] may be used in combination with a sensitizing dye represented by the following general formula [II] or [III] and this is effective in attaining a desired spectral wavelength range and an even higher sensitivity to red light:

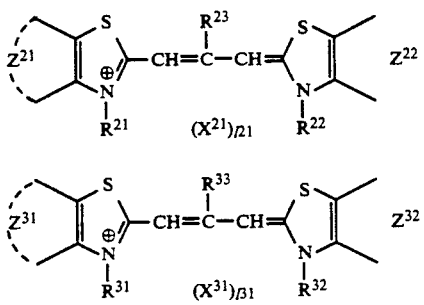

In the general formulas [II] and [III], $R^{21}$, $R^{22}$, $R^{31}$ and $R^{32}$ each independently represents an alkyl group having 1-10 carbon atoms or an alkenyl group having 3-10 carbon atoms and they have the same meaning as $R^1$ and $R^2$; $R^{23}$ and $R^{33}$ each independently represents an alkyl group, a heterocyclic group or an aryl group and they have the same meaning as $R^3$; $Z^{21}$ and $Z^{22}$ each represents the group of non-metallic atoms necessary to form a benzene ring; $Z^{31}$ represents the group of non-metallic atoms necessary to form a benzene or naphthalene ring; $Z^{32}$ represents the group of non-metallic atoms necessary to form a naphthalene ring and it may have a substituent in a desired position as described in connection with $Z^1$; $X^{21}$ and $X^{31}$ each represents an ion that cancels an electric charge in the molecule and they have the same meaning as $X^1$; $l^{21}$ and $l^{31}$ represent the number of ions necessary to cancel electric charges in the molecule, provided that when the compound of interest forms an intramolecular salt, $l^{21}$ and $l^{31}$ are each zero.

Specific examples of the compounds represented by the general formulas [II] and [III] are described below and these are by no means intended to limit the scope of the present invention.

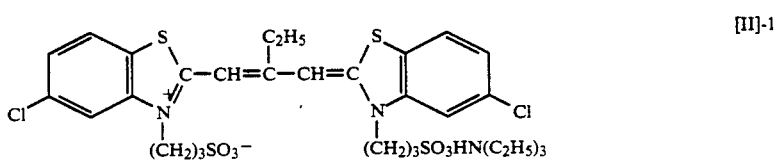

[II]-1

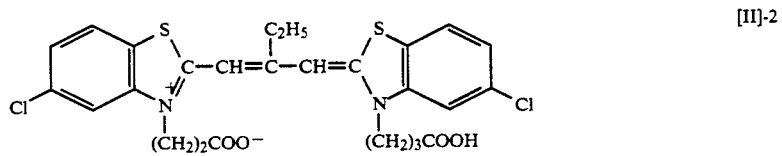

[II]-2

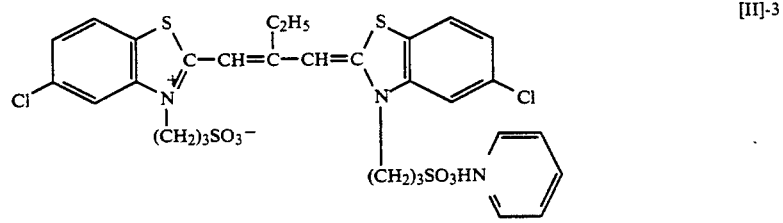

[II]-3

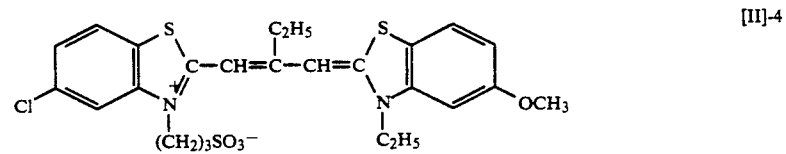

[II]-4

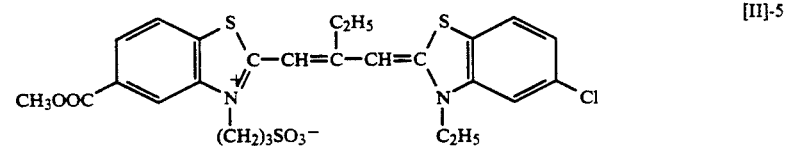

[II]-5

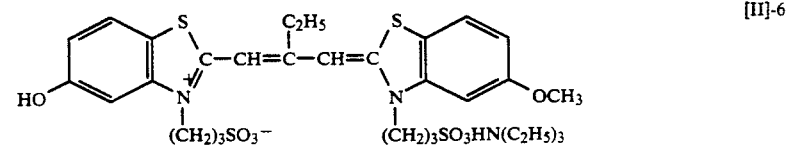

[II]-6

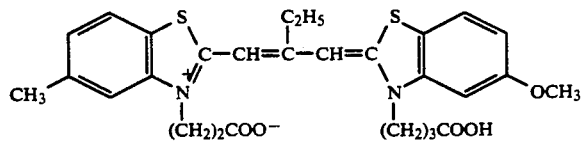 [II]-7
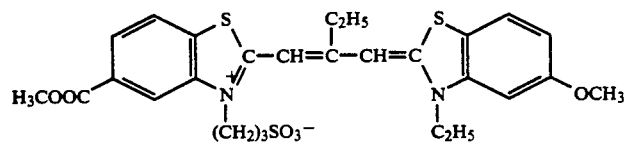 [II]-8
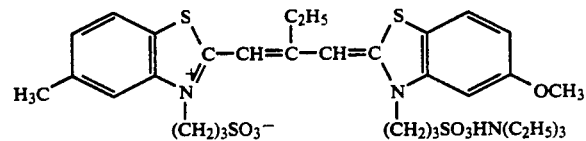 [II]-9
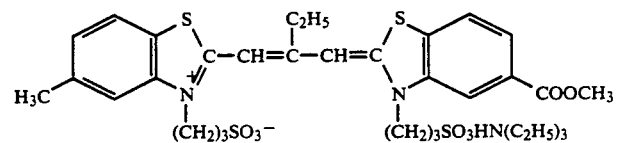 [II]-10
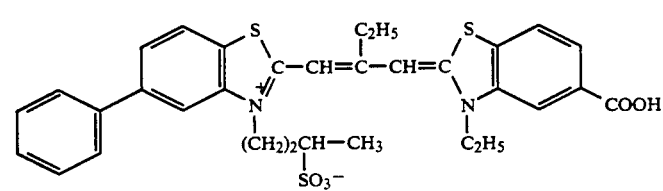 [II]-11
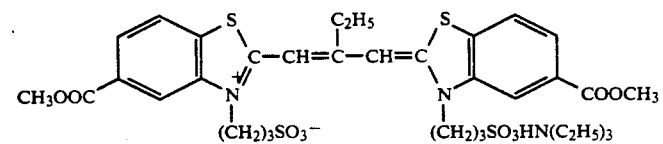 [II]-12
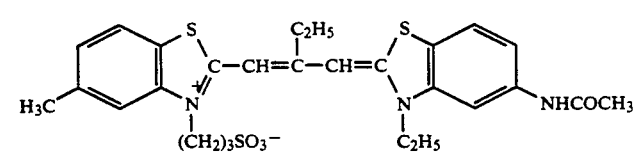 [II]-13
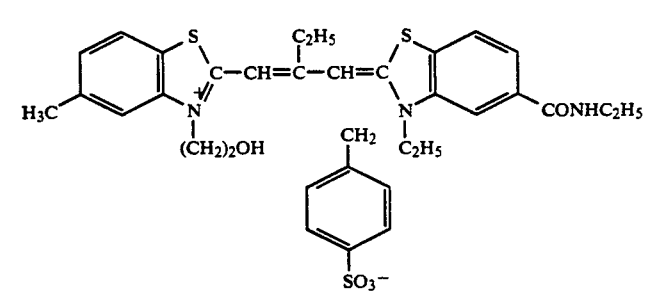 [II]-14
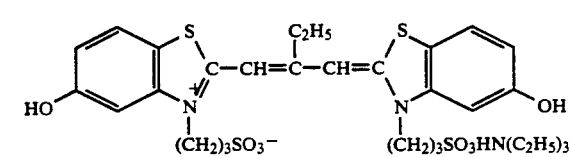 [II]-15

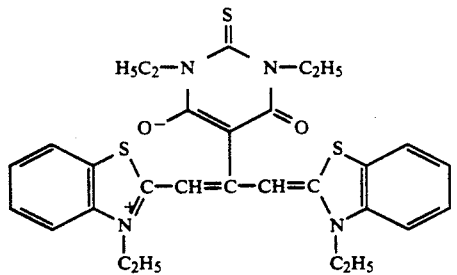
[II]-16
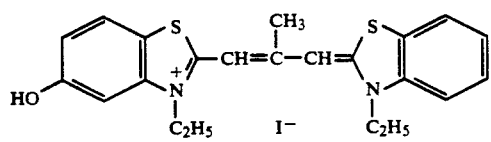
[II]-17
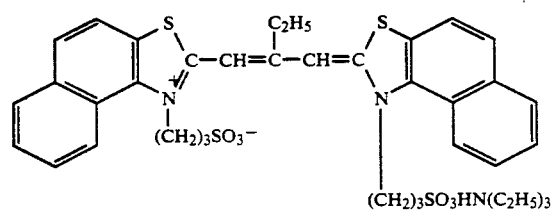
[III]-1
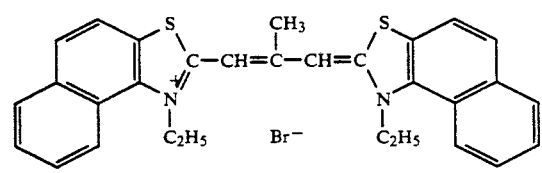
[III]-2
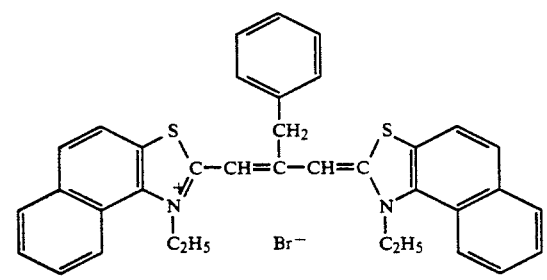
[III]-3
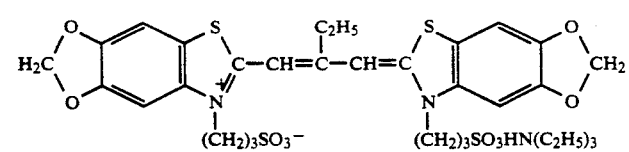
[III]-4
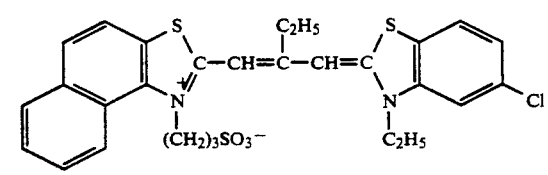
[III]-5
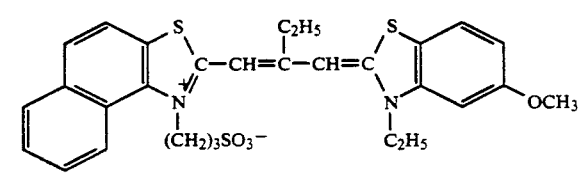
[III]-6

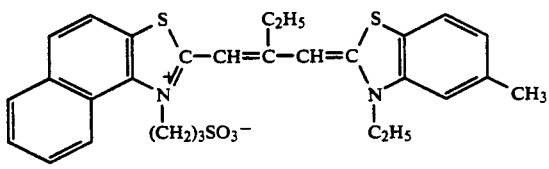

[III]-7

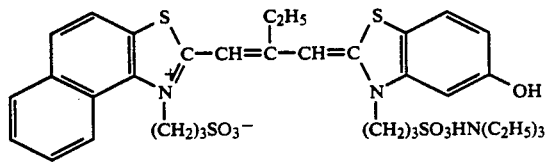

[III]-8

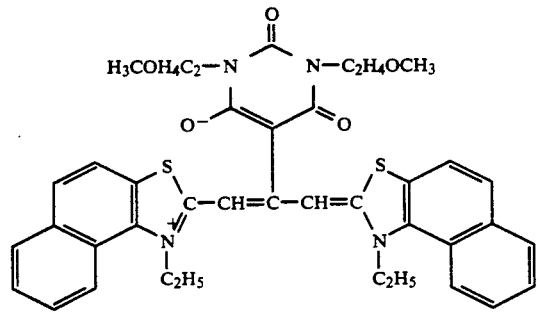

[III]-9

The compounds to be used in the present invention can be readily synthesized by any known methods such as those described in Berichte, 40, 4319 (1907), Journal of Chemical Society, 127, 42–48 (1925), Journal of the American Chemical Society, 39, 2198 (1917), ibid, 41, 1453 (1919), U.S. Pat. No. 4,515,888 and F. M. Hamer, "The Cyanine Dyes And Related Compounds", Interscience Publishers 1964.

The sensitizing dyes of the general formulas [I], [II] and [III] which are to be used in the present invention may be added to silver halide emulsions by any of the following methods known in the art: i) addition after dissolution by protonization as described in Unexamined Published Japanese Patent Applications Nos. 80826/1975 and 80827/1975; ii) addition after dispersion with the aid of a surfactant as described in U.S. Pat. No. 3,822,135, Unexamined Published Japanese Patent Applications Nos. 11419/1975, 135437/1990 and 135438/1990; iii) addition after dispersion in a hydrophilic substrate as described in U.S. Pat. Nos. 3,676,147, 3,469,987, 4,247,627, Unexamined Published Japanese Patent Applications Nos. 59942/1976, 16624/1978, 102732/1978, 102733/1978 and 137131/1978; iv) addition of a solid solution as described in East German Patent 143,324; and v) addition after dissolution in dye dissolving water-soluble solvents (e.g. low-boiling point solvents such as water, methanol, ethanol, propyl alcohol, acetone and fluorinated alcohol, and high-boiling point solvents such as dimethylformamide, methyl cellosolve and phenyl cellosolve) which may be used either independently or in admixture.

The sensitizing dyes of the general formulas [I], [II] and [III] may be added at either one of the following stages of the process of preparing emulsions, in the period of from physical ripening to the end of chemical ripening or in the period of from the end of chemical ripening to the coating of the emulsion; preferably, the dyes are added in the period of from physical ripening to the end of chemical ripening.

The compounds of the present invention may be added during physical ripening, or prior to the addition of a chemical sensitizer in the step of chemical ripening or immediately after the addition of a chemical sensitizer and this is preferred since an even higher spectral sensitivity can be attained.

The amount in which the compounds of the present invention are to be added will vary in a manner that is largely dependent upon the conditions to be used or on the type of emulsion to be prepared. Preferably, the compounds are added in amounts of $1 \times 10^{-6}$ mole to $5 \times 10^{-3}$ mole per mole of silver halide, with the range of $2 \times 10^{-6}$ mole to $2 \times 10^{-3}$ mole being more preferred.

If two or more of the compounds of the present invention are to be used, their mixing ratio may be selected from appropriate amounts that impart a desired sensitivity. Even better results can be attained by using the compounds of the present invention in combination with known supersensitizers. Examples of usable supersensitizers are the compounds described on pages 323–326 of Unexamined Published Japanese Patent Application No. 174740/1987.

Silver halide emulsions to be used in the silver halide photographic material of the present invention may comprise any of the silver halide compositions that are commonly employed in ordinary silver halide emulsions which comprise silver bromide, silver iodobromide, silver iodochloride, silver chlorobromide and silver chloride.

The silver halide grains to be used in silver halide emulsions may have a uniform profile of silver halide composition throughout or they may have different silver halide compositions between the interior and the surface layer.

The silver halide grains may be of a type that has a latent image formed predominantly on the surface or they may be of a type that has a latent image formed predominantly in the interior.

The silver halide emulsions to be used in the present invention may have any grain size distribution; emulsions having a broad size distribution (usually referred to as "polydisperse emulsions") may be used or, alternatively, emulsions having a narrow size distribution (usually referred to as "monodisperse emulsions") may be used either independently or in admixture. If desired, polydisperse emulsions may be used in admixture with monodisperse emulsions.

Two or more silver halide emulsions prepared separately may be used in admixture.

The silver halide grains to be used in the present invention may be chemically sensitized by suitable methods including sulfer sensitization, selenium sensitization, reduction sensitization and noble metal sensitization.

The silver halide grains to be used in the present invention other than those which have been spectrally sensitized by combinations of the sensitizing dyes of the present invention may be spectrally sensitized to a desired wavelength range using dyes that are known as sensitizing dyes in the photographic industry.

Antifoggants, stabilizers and other additives can be added to the silver halide emulsions to be used in the present invention.

Gelatin is advantageously used as a binder (or protective colloid) in emulsions and other components of the silver halide photographic material of the present invention. Other candidates are hydrophilic colloids including gelatin derivatives, graft polymers composed of gelatin and other high-molecular weight compounds, proteins, sugar derivatives, cellulose derivatives and synthetic hydrophilic high-molecular weight substances composed of either homo- or copolymers.

Photographic emulsion layers and other hydrophilic colloidal layers in the silver halide photographic material of the present invention may be hardened by independent or combined use of hardeners which crosslink the molecules of the binder (or protective colloid) to increase the film strength.

Hardeners that can be used, either alone or in combination, in the photographic material of the present invention include: aldehyde compounds, aziridine compounds (as described in PB Report 19,921, U.S. Pat. Nos. 2,950,197, 2,964,404, 2,983,611, 3,271,175, Examined Japanese Patent Publication No. 40898/1971 and Unexamined Published Japanese Patent Application No. 91315/1975), epoxy compounds (as described in U.S. Pat. No. 3,047,394, West German Patent 1,085,663, British Patent 1,033,518, and Examined Japanese Patent Publication No. 35495/1973), vinylsulfone compounds (as described in PB Report 19,920, West German Patents 1,100,924, 2,337,412, 2,545,722, 2,635,518, 2,742,308, 2,749,260, British Patent 1,251,091, Japanese Patent Applications Nos. 54236/1970, 110996/1973, U.S. Pat. Nos. 3,539,644 and 3,490,911), acryloyl compounds (as described in Japanese Patent Application No. 27949/1973 and U.S. Pat. No. 3,640,720), carboxy activated compounds (as described in WO-2357, U.S. Pat. Nos. 2,938,892, 3,331,609, 4,043,818, 4,061,499, Examined Japanese Patent Publications Nos. 38715/1971, 38655/1980, 32699/1983, Unexamined Published Japanese Patent Applications Nos. 155346/1980, 110762/1981, 225148/1985, 100743/1986 and 264044/1987), triazine compounds (as described in West German Patents 2,410,973, 2,553,915, U.S. Pat. No. 3,325,287 and Unexamined Published Japanese Patent Application No. 12722/1977), polymeric compounds (as described in British Patent 822,061, U.S. Pat. Nos. 3,623,878, 3,396,029, 3,226,234, Examined Japanese Patent Publications Nos. 18578/1972, 18579/1972 and 48896/1972), maleimide compounds, acetylene compounds, methanesulfonate ester compounds and N-methylol compounds. Useful combinations of hardeners are described in West German Patents 2,447,587, 2,505,746, 2,514,245, U.S. Pat. Nos. 4,047,957, 3,832,181, 3,840,370, Unexamined Published Japanese Patent Applications Nos. 43319/1973, 63062/1975, 127329/1977 and Examined Japanese Patent Publication No. 32364/1973. Particularly good storage stability is attained if vinylsulfone compounds that have been rendered hydrophilic are used as described, for example, in U.S. Pat. No. 3,539,644, Unexamined Published Japanese Patent Applications Nos. 74832/1973, 24435/1974, 21059/1977, 77076/1977, 41221/1978, 57257/1978 and 241539/1988.

Plasticizers and dispersions (latices) of water-insoluble or slightly water soluble synthetic polymers may be contained in silver halide emulsions.

The silver halide photographic material of the present invention may use couplers. Also usable are competing couplers which are capable of color correction, as well as those compounds which, upon coupling with the oxidation product of developing agents, will release photographically useful fragments such as a development accelerator, a bleach accelerator, a developing agent, a silver halide solvent, a toning agent, a hardener, a foggant, an antifoggant, a chemical sensitizer, a spectral sensitizer and a desensitizer.

Known acyl acetanilide couplers are preferably used as yellow dye forming couplers. Among these, benzoyl acetanilide and pivaloyl acetanilide compounds are particularly useful.

Magenta dye forming couplers may be selected from among 5-pyrazolone couplers, pyrazoloazole couplers, pyrazolobenzimidazole couplers, open-chain acylacetonitrile couplers and indazole couplers.

Phenolic or naphtholic couplers are commonly used as cyan dye forming couplers.

The couplers may be contained in the photographic material by any known techniques that are employed for common couplers. Preferably, the couplers are dissolved in a high-boiling point solvent as it is optionally combined with a low-boiling point solvent, whereby the couplers are dispersed as fine particles before they can be added to the silver halide emulsions to be used in the present invention. In this case, hydroquinone derivatives, uv absorbers, anti-fading additives, etc. may also be used, as required, in combination with the couplers.

Auxiliary layers such as a filter layer, an anti-halo layer and an anti-irradiation layer may be provided in the silver halide photographic material of the present invention. These layers and/or emulsion layers may contain dyes that will flow out of the photographic material or undergo bleaching during development.

The silver halide photographic material of the present invention may also contain a matting agent, a lubricant, an image stabilizer, a uv absorber, an optical brightening agent, a surfactant, a development accelerator, a development retarder and a bleach accelerator.

Photographic emulsion layers and other layers in the silver halide photographic material of the present invention may be provided on various supports that include: flexible reflective bases such as baryta paper, paper laminated with α-olefin polymers or the like, paper bases from which an α-olefin polymer layer is easily strippable, and synthetic paper; reflective bases that have a white pigment coated on films made of semi-synthetic or synthetic polymers such as cellulose acetate, cellulose nitrate, polystyrene, polyvinyl chloride, polyethylene terephthalate, polycarbonate and polyamide; and rigid bases such as glass, metals and ceramics. Thin (120–160 μm) reflecting bases may also be used.

In the case where couplers are contained in the silver halide photographic material of the present invention, dye images are produced by performing known procedures of color photographic processing after exposure.

After color development, the photographic material of the present invention may be immediately treated with a processing solution having a bleaching capability and a processing solution having a fixing capability. Alternatively, the developed photographic material may be treated with a "blix solution", or a processing solution that has both a bleaching and a fixing capability. In either case, metal complex salts of organic acids are used as bleaching agents.

After fixing, the photographic material is usually subjected to washing with water. Instead of washing with water, stabilization may be performed. If desired, both washing and stabilizing may be performed.

The following examples are provided for the purpose of further illustrating the present invention but are in no way to be taken as limiting.

EXAMPLE 1

Silver halide grains were formed by a double-jet method, physically ripened in the usual manner, desalted, and chemically ripened by the combination of gold sensitization with chlorauric acid and sulfer sensitization with sodium thiosulfate, whereby a silver iodobromide emulsion containing 7 mol % AgI was prepared. The silver halide grains contained in this emulsion had a diameter of 0.6 μm. One kilogram of this emulsion contained 0.60 mole of silver halide and 880 g of a gelatin binder.

The emulsion was weighed in 1-kg portions, which were distributed among pots and heated at 40° C. until dissolved. Then, to the emulsion, a sensitizing dye within the scope of the present invention or a comparative sensitizing dye was added as a solution in methanol in the amounts shown in Table 1 (for the names of the respective dyes, also see Table 1) and mixed under agitation.

Further, 20 ml of an aqueous solution of 1.0 wt % 4-hydroxy-6-methyl-1,3,3a,7-tetrazaindene, 10 ml of an aqueous solution of 1 wt % 1-hydroxy-3,5-dichlorotriazine sodium salt and 10 ml of an aqueous solution of 1.0 wt % sodium dodecylbenzenesulfonate were added consecutively and mixed under agitation. The thus completed emulsions were coated onto cellulose triacetate film bases to give a dry thickness of 5 μm and dried to obtain sample Nos. 1–73 of photographic material (for the names and amounts of sensitizing dyes used in the samples, see Table 1).

Each of the samples was slit into strips, one of them was set on a sensitometer having a light source with a color temperature of 5400° K. and subjected to exposure through an optical wedge, with a red filter being attached to the light source. After exposure, all strips were developed with a developing solution (for its formula, see below) at 20° C. for 3 min, stopped, fixed, washed with water and dried to produce a predetermined black-and-white image. The thus processed samples were subjected to densitometry with an optical densitometer to measure their sensitivity and fog. The reference point of optical density for sensitivity determination was set at fog+0.20.

| Formula of developing solution | |
|---|---|
| Metol | 2 g |
| Anhydrous sodium sulfite | 40 g |
| Hydroquinone | 4 g |
| Sodium carbonate (monohydrate) | 28 g |
| Potassium bromide | 1 g |
| Water | to make 1.000 ml |

The results obtained are shown in Table 1, in which "sensitivity" data are expressed in relative values, with the sensitivity of sample No. 23 being taken as 100.

TABLE 1

| Sample | Sensitizing dye and the amount of its use [× $10^{-4}$ mole/mol Ag] | | Sensitivity | Fog | Remarks |
|---|---|---|---|---|---|
| 1 | (1) | 1.4 | 108 | 1.04 | Invention |
| 2 | (1) | 2 | 121 | 0.04 | |
| 3 | (2) | 1.4 | 116 | 0.04 | |
| 4 | (2) | 2 | 118 | 0.04 | |
| 5 | (3) | 1.4 | 115 | 0.04 | Invention |
| 6 | (3) | 2 | 119 | 0.04 | |
| 7 | (4) | 1.4 | 110 | 0.03 | |
| 8 | (4) | 2 | 118 | 0.04 | |
| 9 | (5) | 1.4 | 112 | 0.04 | |
| 10 | (5) | 2 | 111 | 0.04 | |
| 11 | (6) | 1.4 | 110 | 0.04 | |
| 12 | (6) | 2 | 124 | 0.04 | |
| 13 | (8) | 1.4 | 109 | 0.04 | |
| 14 | (8) | 2 | 120 | 0.04 | |
| 15 | (10) | 1.4 | 115 | 0.04 | |
| 16 | (10) | 2 | 116 | 0.03 | |
| 17 | (12) | 1.4 | 111 | 0.04 | |
| 18 | (12) | 2 | 121 | 0.04 | |
| 19 | (14) | 1.4 | 107 | 0.04 | |
| 20 | (14) | 2 | 116 | 0.04 | |
| 21 | (15) | 1.4 | 111 | 0.04 | |
| 22 | (15) | 2 | 110 | 0.04 | |
| 23 | (A) | 1.4 | 100 | 0.04 | Comparison |
| 24 | (A) | 2 | 101 | 0.04 | |
| 25 | (B) | 1.4 | 94 | 0.03 | |
| 26 | (B) | 2 | 103 | 0.04 | Comparison |
| 27 | (C) | 1.4 | 92 | 0.04 | |
| 28 | (C) | 2 | 104 | 0.04 | |

TABLE 1-continued
| | | | | | |
|---|---|---|---|---|---|
| 29 | (17) | 1.4 | 125 | 0.04 | Invention |
| 30 | (17) | 2 | 136 | 0.04 | |
| 31 | (18) | 1.4 | 126 | 0.04 | |
| 32 | (18) | 2 | 133 | 0.03 | |
| 33 | (19) | 1.4 | 124 | 0.03 | |
| 34 | (19) | 2 | 137 | 0.02 | |
| 35 | (20) | 1.4 | 121 | 0.03 | |
| 36 | (20) | 2 | 134 | 0.03 | |
| 37 | (23) | 1.4 | 124 | 0.03 | |
| 38 | (23) | 2 | 138 | 0.03 | |
| 39 | (25) | 1.4 | 125 | 0.03 | |
| 40 | (25) | 2 | 139 | 0.03 | |
| 41 | (27) | 1.4 | 121 | 0.03 | |
| 42 | (27) | 2 | 131 | 0.04 | |
| 43 | (28) | 1.4 | 125 | 0.04 | |
| 44 | (28) | 2 | 139 | 0.04 | |
| 45 | (29) | 1.4 | 128 | 0.04 | |
| 46 | (29) | 2 | 140 | 0.04 | |
| 47 | (31) | 1.4 | 123 | 0.04 | Invention |
| 48 | (31) | 2 | 137 | 0.04 | |
| 49 | (32) | 1.4 | 121 | 0.04 | |
| 50 | (32) | 2 | 137 | 0.04 | |
| 51 | (35) | 1.4 | 126 | 0.04 | |
| 52 | (35) | 2 | 138 | 0.04 | |
| 53 | (36) | 1.4 | 127 | 0.04 | |
| 54 | (36) | 2 | 138 | 0.04 | |
| 55 | (37) | 1.4 | 125 | 0.04 | |
| 56 | (37) | 2 | 139 | 0.04 | |
| 57 | (40) | 1.4 | 124 | 0.04 | |
| 58 | (40) | 2 | 136 | 0.04 | |
| 59 | (45) | 1.4 | 119 | 0.04 | |
| 60 | (45) | 2 | 130 | 0.03 | |
| 61 | (1) | 1.3 | 150 | 0.04 | |
| | [I]-1 | 1.3 | | | |
| | [II]-1 | 0.16 | | | |
| 62 | (4) | 1.3 | 165 | 0.04 | |
| | [I]-1 | 1.3 | | | |
| | [II]-1 | 0.16 | | | |
| 63 | (6) | 1.3 | 180 | 0.04 | Invention |
| | [I]-1 | 1.3 | | | |
| | [II]-1 | 0.16 | | | |
| 64 | (6) | 1.3 | 175 | 0.04 | |
| | [I]-4 | 1.3 | | | |
| | [II]-5 | 0.16 | | | |
| 65 | (12) | 1.3 | 155 | 0.04 | |
| | [I]-1 | 1.3 | | | |
| | [II]-1 | 0.16 | | | |
| 66 | (14) | 1.3 | 150 | 0.04 | |
| | [I]-1 | 1.3 | | | |
| | [II]-1 | 0.16 | | | |
| 67 | (17) | 1.3 | 155 | 0.04 | |
| | [I]-1 | 1.3 | | | |
| | [II]-1 | 0.16 | | | |
| 68 | (18) | 1.3 | 160 | 0.04 | |
| | [I]-1 | 1.3 | | | |
| | [II]-1 | 0.16 | | | |
| 69 | (24) | 1.3 | 150 | 0.04 | |
| | [I]-1 | 1.3 | | | |
| | [II]-1 | 0.16 | | | |
| 70 | (6) | 0.8 | 145 | 0.04 | Invention |
| | [I]-1 | 0.8 | | | |
| | [II]-1 | 0.1 | | | |
| 71 | (6) | 1.3 | 160 | 0.04 | |
| | [I]-1 | 1.3 | | | |
| 72 | (A) | 1.3 | 120 | 0.04 | Comparison |
| | [I]-1 | 1.3 | | | |
| | [II]-1 | 0.16 | | | |
| 73 | (B) | 1.3 | 110 | 0.04 | |
| | [I]-1 | 1.3 | | | |
Comparative sensitizing dyes:
(A) 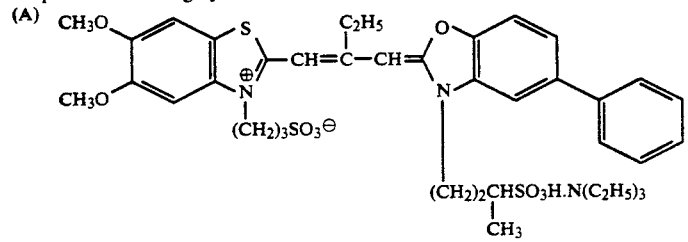

TABLE 1-continued

See U.S. Pat. No. 4,326,023

(B) 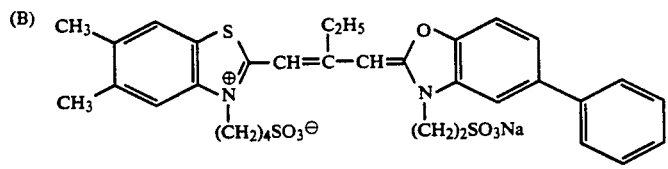

See Unexamined Published Japanese Patent Application No. 128433/1985

(C) 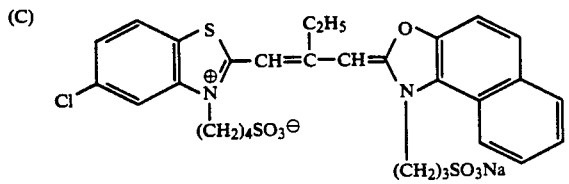

See Unexamined Published Japanese Patent Application No. 282831/1986

(D) 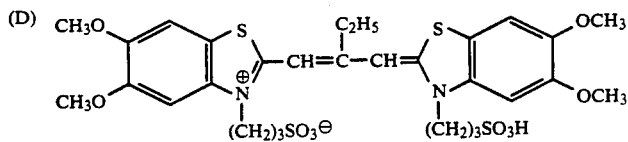

See Unexamined Published Japanese Patent Application No. 62355/1987

(E) 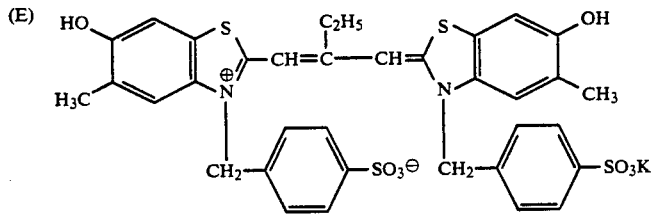

See Unexamined Published Japanese Patent Application No. 62355/1987

(F) 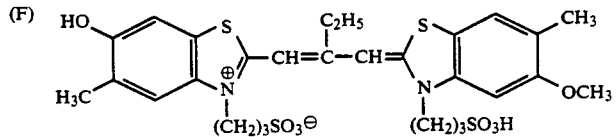

See Unexamined Published Japanese Patent Application No. 62355/1987.

As is clear from Table 1, the sensitizing dyes within the scope of the present invention produced a comparable level of fog to the known comparative dyes and yet achieved higher sensitivities.

EXAMPLE 2

A silver iodobromide emulsion containing 7 mol % of silver iodide was chemically ripened in the usual manner to give an average grain size of 1.0 μm, a silver content of 0.60 mol per kg and a gelatin content of 70 g per kg. To the emulsion, a sensitizing dye within the scope of the present invention or a comparative sensitizing dye (for their names, see Table 2) was added as a solution in methanol in a predetermined amount (see Table 2).

Two kilograms each of the emulsions thus prepared was divided into two parts, emulsion A and emulsion B. Emulsion A was heated at 40° C. and 500 g of an emulsion of cyan coupler D was added. The emulsion of coupler D was prepared by first adding 300 ml of ethyl acetate and 100 ml of dibutyl phthalate to dissolve the coupler, then adding sodium triisopropylnaphthalenesulfonate, and dispersing the mixture in 1 kg of an aqueous solution of 10% gelatin with a homogenizer. To the dispersion, 20 ml of an aqueous solution of 1.0 wt % 4-hydroxy-6-methyl-1,3,3a-7-tetrazaindene and 20 ml of an aqueous solution of 3 wt % bisvinylsulfonyl methyl ether were added and, then, 10 ml of an aqueous solution of 1.0 wt % sodium dodecylbenzenesulfonate was added, followed by agitation of the mixture. The completed emulsion was coated onto a cellulose triacetate film base to give a silver deposit of 3 g/m² and dried to prepare a film sample. Without being exposed, the film sample was processed in accordance with the scheme to be described below. The color density of the thus processed sample was designated Dc. Emulsion B was similarly coated onto a cellulose triacetate film base to give a silver deposit of 3 g/m² and dried to prepare a film sample. Without being exposed, the film sample was processed as in Example 1 and the color density of the thus processed sample was designated Do.

Coupler D:

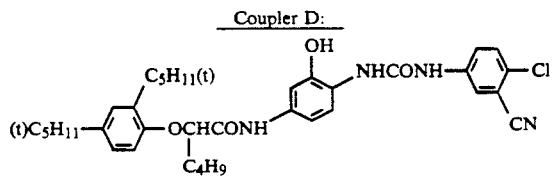

The values of Dc/Do × 100 (%) are listed in Table 2.

| Processing scheme | |
|---|---|
| 1. Color development | 3 min and 15 sec |
| 2. Bleaching | 6 min and 30 sec |
| 3. Washing with water | 3 min and 15 sec |
| 4. Fixing | 6 min and 30 sec |
| 5. Washing with water | 3 min and 15 sec |
| 6. Stabilizing | 3 min and 15 sec |

The processing solutions used in steps 1, 2, 4 and 6 had the following formulas.

| Color developing solution | |
|---|---|
| Sodium nitrilotriacetate | 1.0 g |
| Sodium sulfite | 4.0 g |
| Sodium carbonate | 30.0 g |
| Potassium bromide | 1.4 g |
| Hydroxylamine sulfate | 2.4 g |
| 4-(N-Ethyl-N-β-hydroxyethylamino)-2-methylaniline sulfate | 4.5 g |
| Water | to make 1,000 ml |
| Bleaching solution | |
| Ammonium bromide | 160.0 Kg |
| Aqueous ammonia (28%) | 25.0 ml |
| Ethylenediaminetetraacetic acid sodium iron salt | 130.0 kg |
| Glacial acetic acid | 14.0 ml |
| Water | to make 1,000 ml |
| Fixing solution | |
| Sodium tetrapolyphosphate | 2.0 g |
| Sodium sulfite | 4.0 g |
| Ammonium thiosulfate (70%) | 175.0 ml |
| Sodium bisulfite | 4.6 g |
| Water | to make 1,000 ml |
| Stabilizing solution | |
| Formaldehyde | 8 ml |
| Water | to make 1,000 ml |

TABLE 2

| Sample | Sensitizing dye and the amount of its use [×10⁻⁴mol/mol Ag] | Dc/Do | Remarks |
|---|---|---|---|
| 74 | (1) | 2.0 | 1.04 | |
| 75 | (1) | 4.0 | 1.15 | |
| 76 | (3) | 2.0 | 1.10 | |
| 77 | (3) | 4.0 | 1.24 | |
| 78 | (5) | 2.0 | 1.02 | |
| 79 | (5) | 4.0 | 1.10 | |
| 80 | (6) | 2.0 | 1.04 | |
| 81 | (6) | 4.0 | 1.13 | |
| 82 | (9) | 2.0 | 1.07 | Invention |
| 83 | (9) | 4.0 | 1.19 | |
| 84 | (12) | 2.0 | 1.20 | |
| 85 | (12) | 4.0 | 1.34 | |
| 86 | (15) | 2.0 | 1.09 | |
| 87 | (15) | 4.0 | 1.24 | |
| 88 | (17) | 2.0 | 1.18 | |
| 89 | (17) | 4.0 | 1.31 | |
| 90 | (19) | 2.0 | 1.06 | |
| 91 | (19) | 4.0 | 1.18 | |
| 92 | (21) | 2.0 | 1.12 | |

TABLE 2-continued

| Sample | Sensitizing dye and the amount of its use [×10⁻⁴mol/mol Ag] | Dc/Do | Remarks |
|---|---|---|---|
| 93 | (21) | 4.0 | 1.25 | |
| 94 | (22) | 2.0 | 1.15 | |
| 95 | (22) | 4.0 | 1.32 | |
| 96 | (26) | 2.0 | 1.08 | |
| 97 | (26) | 4.0 | 1.28 | |
| 98 | (31) | 2.0 | 1.21 | |
| 99 | (31) | 4.0 | 1.63 | Invention |
| 100 | (36) | 2.0 | 1.12 | |
| 101 | (36) | 4.0 | 1.30 | |
| 102 | (39) | 2.0 | 1.16 | |
| 103 | (39) | 4.0 | 1.35 | |
| 104 | (41) | 2.0 | 1.15 | |
| 105 | (41) | 4.0 | 1.40 | |
| 106 | (A) | 2.0 | 1.75 | |
| 107 | (A) | 4.0 | 2.25 | |
| 108 | (B) | 2.0 | 1.52 | |
| 109 | (B) | 4.0 | 2.10 | |
| 110 | (C) | 2.0 | 1.60 | Comparison |
| 111 | (C) | 4.0 | 2.20 | |
| 112 | (D) | 2.0 | 1.42 | |
| 113 | (D) | 4.0 | 1.85 | |
| 114 | (E) | 2.0 | 1.60 | |
| 115 | (E) | 4.0 | 2.05 | |
| 116 | (F) | 2.0 | 1.70 | Comparison |
| 117 | (F) | 4.0 | 2.22 | |
| 118 | — | 0 | 1.0 | Control |

As is clear from Table 2, the sensitizing dyes within the scope of the present invention caused less contamination by color remnant than the known comparative sensitizing dyes in a system containing oily agents.

Using a sensitometer equipped with a light source having a color temperature of 5400° K., all samples were exposed through an optical wedge with a red filter attached to the light source. Each of the samples prepared in accordance with the present invention produced high color sensitivity but low fog.

The silver halide photographic material of the present invention has the advantage of having an enhanced spectral sensitivity in the red wavelength range while causing less color contamination.

What is claimed is:

1. In a silver halide photographic material that comprises a base and overlying photographic constituent layers including at least one light-sensitive silver halide emulsion layer, the improvement wherein the silver halide grains contained in at least one of said light-sensitive silver halide emulsion layers are spectrally sensitized with at least one sensitizing dye represented by the following general formula [I]:

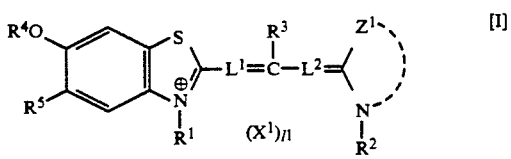

where $R^1$ and $R^2$ each independently represents an alkyl group having 1-10 carbon atoms or an alkenyl group having 3-10 carbon atoms; $R^3$ represents a hydrogen atom, a heterocyclic group, an aryl group or an alkyl group; $R^4$ and $R^5$ each represents an alkyl group; $Z^1$ represents the group of non-metallic atoms necessary to form a 5-membered monocyclic or condensed nitrogenous hetero ring; $L^1$ and $L^2$ each represents a methine group, provided that $R^1$ or $R^2$ may combine with $L^1$ or $L^2$, respectively, to form a 5- or 6-membered hetero ring; $X^1$ represents an ion that cancels an electric charge in the molecule; $l^1$ represents the number of ions necessary to cancel electric charges in the molecule, provided that when the compound of interest forms an intramolecular salt, $l^1$ is zero.

2. A silver halide photographic material according to claim 1 wherein the sensitizing dye of the general formula [I] is used in combination with a sensitizing dye represented by the following general formula [II] or [III]:

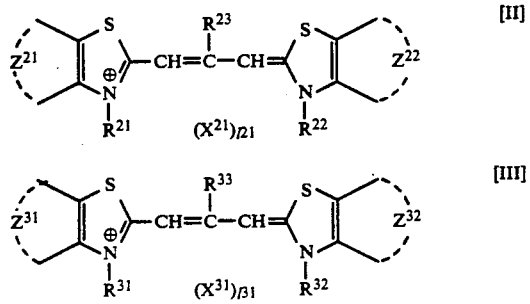

where $R^{21}$, $R^{22}$, $R^{31}$ and $R^{32}$ each independently represents an alkyl group having 1-10 carbon atoms or an alkenyl group having 3-10 carbon atoms; $R^{23}$ and $R^{33}$ each independently represents an alkyl group, a heterocyclic group or an aryl group; $Z^{21}$ and $Z^{22}$ each represents the group of non-metallic atoms necessary to form a benzene ring; $Z^{31}$ represents the group of non-metallic atoms necessary to form a benzene or naphthalene ring; $Z^{32}$ represents the group of non-metallic atoms necessary to form a naphthalene ring; $X^{21}$ and $X^{31}$ each represents an ion that cancels an electric charge in the molecule; $l^{21}$ and $l^{31}$ represent the number of ions necessary to cancel electric charges in the molecule, provided that when the compound of interest is an intramolecular salt, $l^{21}$ and $l^{31}$ are each zero.

3. A silver halide photographic material according to claim 1 or 2 wherein the sensitizing dye of the general formula [I] or the general formula [II] or [III] is added at a stage of the process of emulsion preparation in the period of from physical ripening to the end of chemical ripening.

4. A silver halide photographic material according to claim 3 wherein the sensitizing dye of the general formula [I] or the general formula [II] or [III] is added either prior to or immediately after the addition of a chemical sensitizer.

5. A silver halide photographic material according to claim 1 or 2 wherein the sensitizing dye of the general formula [I] or the general formula [II] or [III] is added in a total amount of from $1 \times 10^{-6}$ to $5 \times 10^{-3}$ mole per mole of silver halide.

* * * * *

UNITED STATES PATENT AND TRADEMARK OFFICE
CERTIFICATE OF CORRECTION

PATENT NO. : 5,302,506
DATED : April 12, 1994
INVENTOR(S) : Nobuaki Kagawa et al.

It is certified that error appears in the above-indentified patent and that said Letters Patent is hereby corrected as shown below:

In the ABSTRACT, Line, 12 before "$^1$ represents" insert --$\ell$--.

Claim 1, Column 31, Lines 2 and 5, change "$1^1$" to --$\ell^1$--. *

Claim 2, Column 32, Lines 7 and 10, change "$1^{21}$" and "$1^{31}$" to --$\ell^{21}$-- and --$\ell^{31}$--. *

Signed and Sealed this

Seventeenth Day of January, 1995

Attest:

BRUCE LEHMAN

Attesting Officer     Commissioner of Patents and Trademarks